United States Patent
Tringali et al.

(10) Patent No.: US 8,046,524 B2
(45) Date of Patent: Oct. 25, 2011

(54) MANAGING PROCESSING DELAYS IN AN ISOCHRONOUS SYSTEM

(75) Inventors: J. James Tringali, Los Altos, CA (US); Sergey A. Gorobets, Edinburgh (GB); Shai Traister, San Jose, CA (US); Yosief Ataklti, Fremont, CA (US)

(73) Assignee: Sandisk Technologies Inc., Plano, TX (US)

( * ) Notice: Subject to any disclaimer, the term of this patent is extended or adjusted under 35 U.S.C. 154(b) by 453 days.

(21) Appl. No.: 11/864,793

(22) Filed: Sep. 28, 2007

(65) Prior Publication Data

US 2009/0043947 A1    Feb. 12, 2009

Related U.S. Application Data

(60) Provisional application No. 60/954,694, filed on Aug. 8, 2007.

(51) Int. Cl.
*G06F 13/00* (2006.01)
*G06F 3/00* (2006.01)

(52) U.S. Cl. .......... 711/103; 711/154; 711/E21.008; 711/E12.103; 710/15

(58) Field of Classification Search .......... 711/103, 711/154; 710/15
See application file for complete search history.

(56) References Cited

U.S. PATENT DOCUMENTS

| | | | |
|---|---|---|---|
| 5,509,134 A * | 4/1996 | Fandrich et al. | 711/103 |
| 5,956,742 A * | 9/1999 | Fandrich et al. | 711/103 |
| 5,978,952 A | 11/1999 | Hayek et al. | |
| 6,148,357 A | 11/2000 | Gulick et al. | |
| 6,167,484 A | 12/2000 | Boyer et al. | 711/106 |
| 6,247,069 B1 | 6/2001 | Smyers | |
| 7,012,835 B2 | 3/2006 | Gonzalez et al. | 711/106 |
| 7,020,741 B1 | 3/2006 | Tischler | 711/106 |
| 7,224,607 B2 | 5/2007 | Gonzalez et al. | |
| 7,328,365 B2 | 2/2008 | Karpuszka et al. | |
| 7,573,773 B2 | 8/2009 | Lin | |
| 7,577,768 B2 | 8/2009 | Ohnishi | |
| 2004/0042320 A1* | 3/2004 | Dodd et al. | 365/230.06 |
| 2004/0237022 A1* | 11/2004 | Karpuszka et al. | 714/764 |
| 2005/0073884 A1 | 4/2005 | Gonzalez et al. | |
| 2005/0091445 A1* | 4/2005 | Chang et al. | 711/103 |
| 2006/0101210 A1 | 5/2006 | Dover | |
| 2006/0161728 A1 | 7/2006 | Bennett et al. | |
| 2006/0230315 A1 | 10/2006 | Moyer | |
| 2007/0079185 A1 | 4/2007 | Totolos | |

(Continued)

FOREIGN PATENT DOCUMENTS

WO    WO 2009/021176    2/2009

OTHER PUBLICATIONS

U.S. Appl. No. 11/566,685, filed Dec. 4, 2006, Elhamias et al.

(Continued)

*Primary Examiner* — Edward J Dudek, Jr.
(74) *Attorney, Agent, or Firm* — Weaver Austin Villeneuve and Sampson LLP

(57) ABSTRACT

Command cycles incorporate mechanisms to inform a host processor in advance of a need to service the memory so that the host can respond when it suits the host, but in time for the service to be performed before a catastrophic failure. The regular host cycle need not be interrupted for such notification.

9 Claims, 7 Drawing Sheets

U.S. PATENT DOCUMENTS

| | | | |
|---|---|---|---|
| 2007/0156950 A1* | 7/2007 | Durante et al. | 711/103 |
| 2007/0180328 A1 | 8/2007 | Cornwell et al. | |
| 2007/0234101 A1 | 10/2007 | Koktan et al. | |
| 2008/0189522 A1* | 8/2008 | Meil et al. | 712/220 |
| 2008/0235466 A1 | 9/2008 | Traister | |
| 2009/0044190 A1 | 2/2009 | Tringali et al. | |
| 2009/0164681 A1 | 6/2009 | Elhamias et al. | |
| 2010/0030961 A9 | 2/2010 | Ma et al. | |

OTHER PUBLICATIONS

U.S. Appl. No. 11/618,829, filed Dec. 31, 2006, Elhamias et al.
U.S. Appl. No. 11/692,829, filed Mar. 28, 2007, Lin.
U.S. Appl. No. 11/726,648, filed Mar. 21, 2007, Traister et al.
U.S. Appl. No. 11/864,740, filed Sep. 28, 2007, Tringali.
Partial International Search Report mailed Jan. 13, 2009 in Application No. PCT/US2008/072609.
International Search Report and Written Opinion mailed Mar. 2, 2009 in Application No. PCT/US2008/072609.
U.S. Office Action mailed Mar. 22, 2010 in U.S. Appl. No. 11/864,740.
U.S. Final Office Action mailed Oct. 26, 2010 in U.S. Appl. No. 11/864,740.
U.S. Office Action mailed Mar. 17, 2011 in U.S. Appl. No. 11/864,740.

* cited by examiner

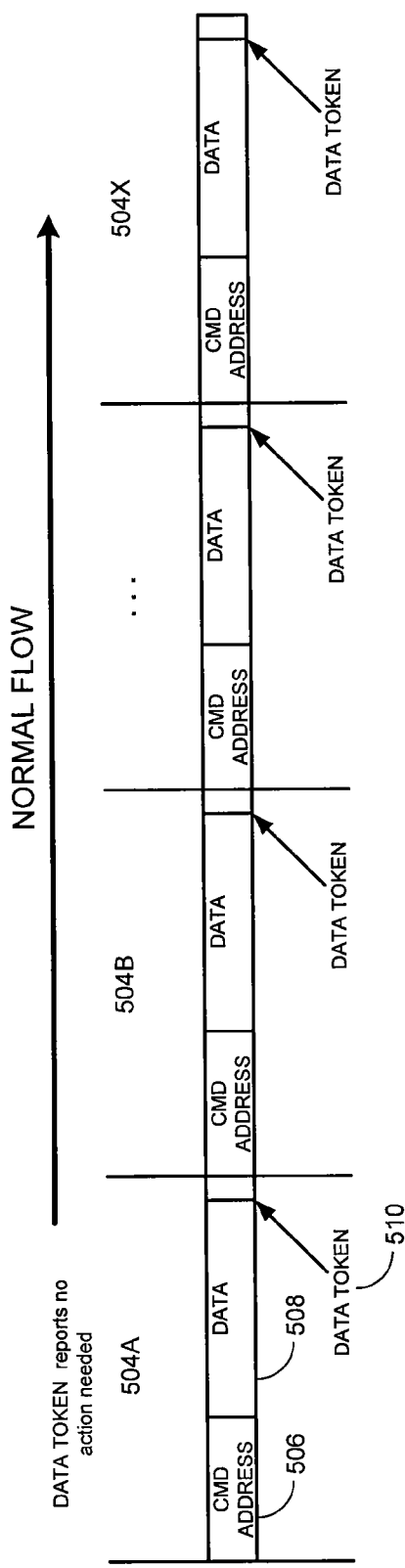
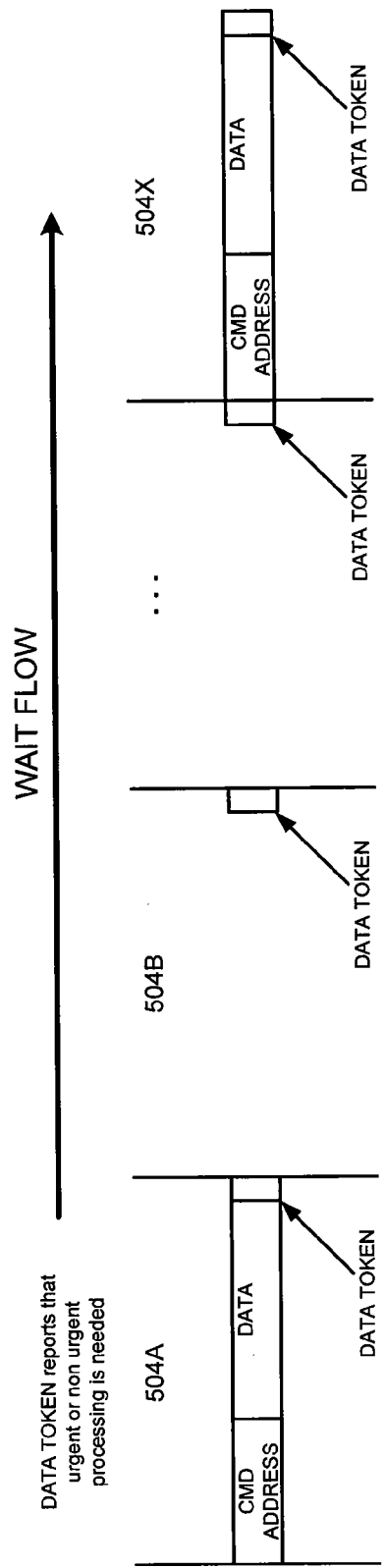
FIG. 5A
FIG. 5B

MANAGING PROCESSING DELAYS IN AN ISOCHRONOUS SYSTEM

CROSS REFERENCE TO RELATED APPLICATIONS

This application claims the benefit of U.S. Provisional Patent Application No. 60/954,694, filed Aug. 8, 2007 entitled "Managing Processing Delays in an Isochronous System" to Tringali et al. This application is incorporated in its entirety by reference as if fully set forth herein.

This application is related to U.S. patent application Ser. No. 11/864,740, entitled "Urgency and Time Window Manipulation to Accommodate Unpredictable Memory Operations", filed on the same day as the present application. This application is incorporated in its entirety by reference as if fully set forth herein.

BACKGROUND

Prior systems based on isochronous processors have typically relied on read only memory (ROM) for rapid access to code that needs to be rapidly executed by the processor. ROM has long been a preferred code storage device for executable applications where uninterrupted and predictable access is an issue. However, ROM cannot be easily reprogrammed or programmed at the last minute. A ROM is typically masked out long in advance for a the specific code/application and once masked and subsequently manufactured it cannot be changed in most scenarios. This thus results in large inventories of product that may or may not be well received in the marketplace. For consumer related devices where inventory must be produced before demand can be accurately gauged, this may result in unsold inventory.

While use of flash memory allows for different programs to be loaded on the same hardware quickly and easily, use of certain types of flash memory is problematic in isochronous systems due to the operations that the memory performs to ensure data reliability. The background operations performed to ensure data integrity result in unpredictable latency times when reading data from the flash memory. This is especially true for NAND flash memory.

In an isochronous system that incorporates NAND flash memory the unpredictable latency times of the flash memory are problematic. This is particularly true for read operations.

NAND memory typically includes memory management operations to accommodate for the physical limitations of the NAND memory cells. These operations may be taking place when a read command is received, and thus the called for data may not be immediately received.

SUMMARY

Various aspects and embodiments allow for a flash memory storage device with variable latency in responding to data storage commands or requests from a host device to be used in demanding environments where a ROM might otherwise be used to provide a program. For example, mechanisms within the flash memory controller allow the memory controller to accommodate both the physical limitations of the flash memory and the needs of a host processor to quickly and regularly access the memory.

This for example, allows the flash memory storage device to be used not only in read intensive environments but also in isochronous systems where flow control cannot be introduced. For example, embodiments of the present invention may be used is systems where there is not a wait, busy, or ready signal to assert or de-assert on the bus.

BRIEF DESCRIPTION OF THE DRAWINGS

FIGS. 5A and 5B illustrate a second embodiment of command and data structure and flow for normal and wait flow respectively.

DESCRIPTION OF EXEMPLARY EMBODIMENTS

Memory Architectures and their Operation

Figure 1A:
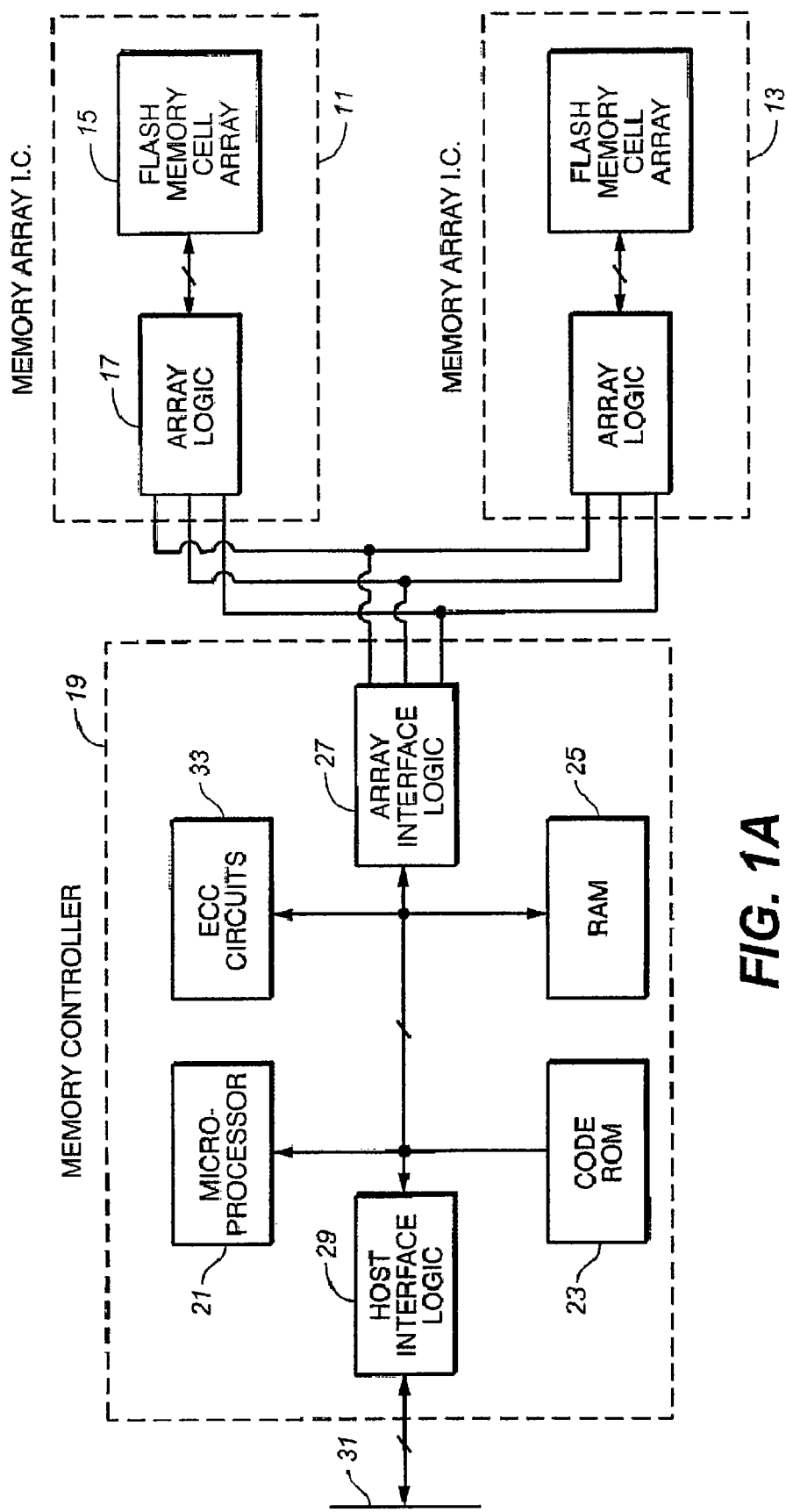
FIGS. 1A and 1B are block diagrams of a non-volatile memory and a host system, respectively, that operate together.

Referring initially to FIG. 1A, a flash memory includes a memory cell array and a controller. In the example shown, two integrated circuit devices (chips) 11 and 13 include an array 15 of memory cells and various logic circuits 17. The logic circuits 17 interface with a controller 19 on a separate chip through data, command and status circuits, and also provide addressing, data transfer and sensing, and other support to the array 13. A number of memory array chips can be from one to many, depending upon the storage capacity provided. The controller and part or the entire array can alternatively be combined onto a single integrated circuit chip but this is currently not an economical alternative.

A typical controller 19 includes a microprocessor 21, a read-only-memory (ROM) 23 primarily to store firmware and a buffer memory (RAM) 25 primarily for the temporary storage of user data either being written to or read from the memory chips 11 and 13. Circuits 27 interface with the memory array chip(s) and circuits 29 interface with a host though connections 31. The integrity of data is in this example determined by calculating an ECC with circuits 33 dedicated to calculating the code. As user data is being transferred from the host to the flash memory array for storage, the circuit calculates an ECC from the data and the code is stored in the memory. When that user data are later read from the memory, they are again passed through the circuit 33 which calculates the ECC by the same algorithm and compares that code with the one calculated and stored with the data. If they compare, the integrity of the data is confirmed. If they differ, depending upon the specific ECC algorithm utilized, those bits in error, up to a number supported by the algorithm, can be identified and corrected. Typically, an ECC algorithm is used that can correct up to 8 bits in a 512 byte sector. This number of correctable bits is predicted to increase in time.

Figure 1B:
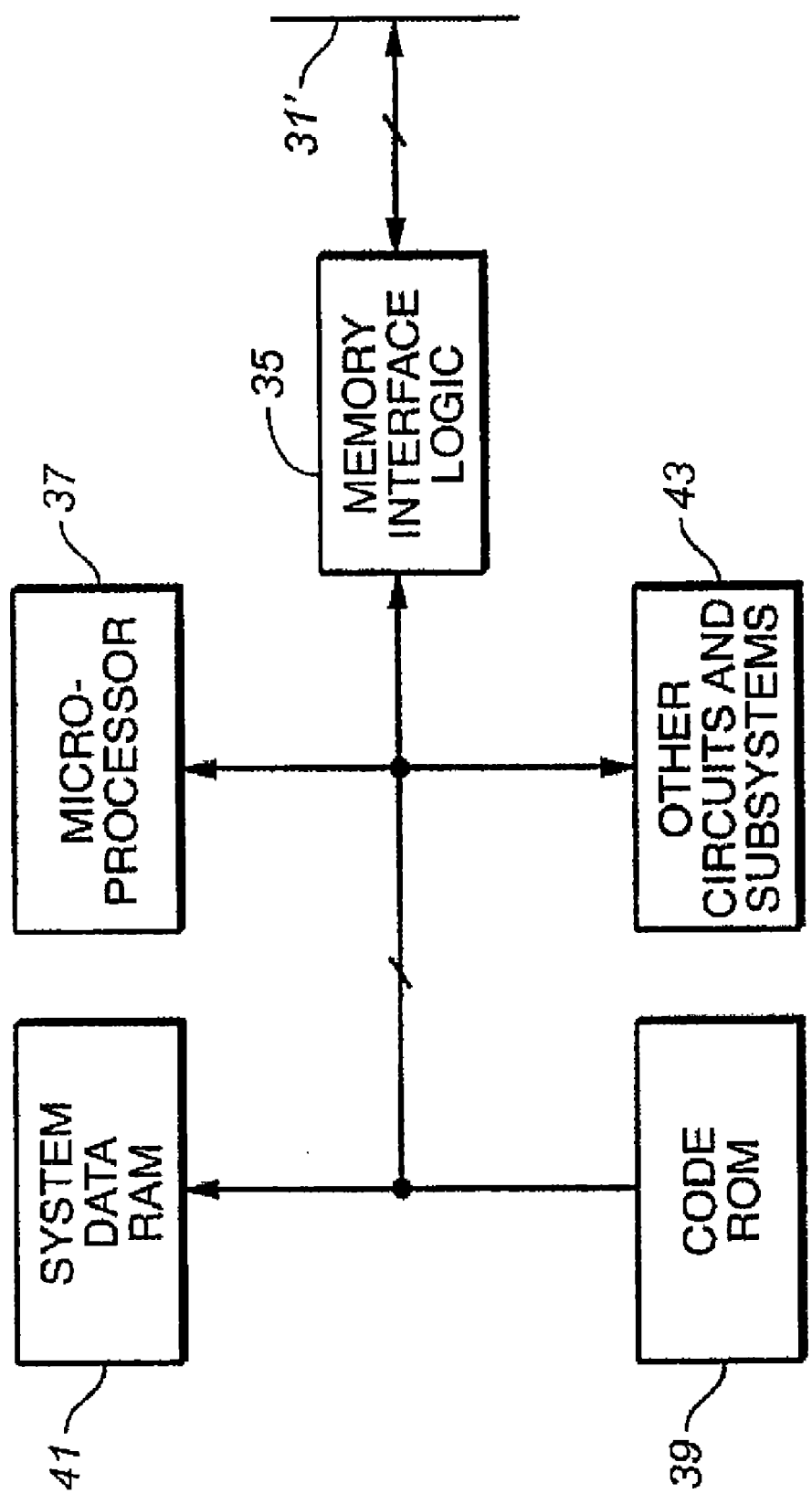

The connections 31 of memory of FIG. 1A mate with connections 31' of a host system, an example of which is given in FIG. 1B. Data transfers between the host and the memory of FIG. 1A through interface circuits 35. A typical host also includes a microprocessor 37, a ROM 39 for storing firmware code and RAM 41. Other circuits and subsystems 43 often include a high capacity magnetic data storage disk drive, interface circuits for a keyboard, a monitor and the like, depending upon the particular host system. Some examples of such hosts include desktop computers, laptop computers, handheld computers, palmtop computers, personal digital assistants (PDAs), MP3 and other audio players, digital cameras, video cameras, electronic game machines, wireless and wired telephony devices, answering machines, voice recorders, network routers and others.

The memory of FIG. 1A may be implemented as a small enclosed card, cartridge, or drive containing the controller and all its memory array circuit devices in a form that is removably connectable with the host of FIG. 1B. That is, mating connections 31 and 31' allow a card to be disconnected and moved to another host, or replaced by connecting another card to the host. Alternatively, the memory array devices may be enclosed in a separate card that is electrically and mechanically connectable with a card containing the controller and connections 31. As a further alternative, the memory of FIG. 1A may be embedded within the host of FIG. 1B, wherein the connections 31 and 31' are permanently made. In this case, the memory is usually contained within an enclosure of the host along with other components.

In NAND memory, media errors are introduced through device cell stresses induced by read and write operations. The useful life of a NAND memory can be maximized by monitoring the increasing error levels and moving the data to a physical location which has experienced lower access activity. In systems utilizing NAND memory today, this media repair activity is performed as a background operation. These operations happen during bus idle times or during read or write requests extended by hardware flow control techniques.

As part of those background operations, blocks are occasionally copied or updated to other locations when the physical reliability of a particular block cannot be depended upon. For example, if the error rate of a block appears as if it will shortly be unreadable, even with multiple read cycles and thresholds, a block may be updated. For example, if the number of errors is not correctable with ECC, an update would be necessary.

Also in NAND, read operations cause disturbs, one of the aforementioned cell stresses. Certain systems incorporating NAND memory may be very read intensive, thus increasing the importance of the data correction and scrub techniques. For example, a video game system reads the memory very often to update the image being displayed during the game. While the background display may only be written once, it is read very frequently. Thus the effect of disturbs will be particularly noteworthy in such a case and must be mitigated.

Error Detection and Data Integrity in NAND Memory

There are two individual measures of data quality that can be used as thresholds to determine if corrective action should be taken: 1) the detection of data errors through use of ECC, and 2) even though few or no data errors are detected, a shift in the charge storage levels can be detected before they cause data read errors.

The purpose of a scrub operation is to detect disturbed storage elements before the number of bits in error and the level of shifted cells exceed any recovery schemes available on the memory system. To this end, it is generally desirable to detect disturb as early as possible and before much of the guard band for a given voltage threshold level has been lost to disturb.

Flash memories usually store data at discrete states, or ranges of charge storage levels, each of which is separated from other states by some guard band. There is generally a nominal sensing level of discrimination between each state above which a storage element is deemed to be in one state, and below which it is deemed to be in another state. As a given storage element is disturbed, the level to which it has been programmed or erased may begin to shift. If the level of the storage element approaches the sensing level of discrimination, or crosses over it, it produces data in a state different that that to which it was programmed or erased. The error will generally manifest itself as one or more bits in error in the data, and will generally be detected through the use of ECC covering the data field.

Margining or biasing the read conditions such that the sensing level of discrimination is shifted more toward one state or another will cause disturbed storage elements to be sensed in the wrong state even if the amount of shift would not cause an error under nominal read conditions. This allows the system to detect shift before it approaches the point at which it would cause errors during normal memory system operation.

If disturb mechanisms are known to affect data storage levels in a specific way, it is possible to target detection of those specific disturb mechanisms by margining read conditions toward the expected level shifts. While the ideal situation would be to target the expected disturb mechanisms with a single read operation under a single set of margin conditions, this may not usually be possible. It may be necessary to perform multiple read operations under different conditions. For example, it is possible that different disturb mechanisms present in a memory cause storage elements to become either more programmed or more erased. Storage elements both above and below a discrimination level may be shift toward it, in which case it may be necessary to check first for a shift in the storage levels toward a discrimination level from one state, and then from the other.

As discussed above, the scrub read conditions may be margined in order to target certain expected disturb mechanisms, or to simply check for sufficient margin in the stored levels. Whether the data was read under nominal or margined conditions, the decision whether or not to take corrective action may be based on the number of bits in error detected during the scrub read operation. For example, if the number of bits in error are below the ECC correction capabilities of the system, the system may decide to defer the corrective action, or to ignore the error altogether.

In addition to using the number of bits in error as a threshold to initiating corrective action, the system may make the decision to correct based on other factors such as the pattern of bits in error. For example, the ECC correction capabilities may be sensitive to bit error pattern, or bit error patterns may be indicative of a particular known disturb mechanism in the nonvolatile memory. There may be other reasons for basing the threshold on bit error patterns. The bit error pattern is generally revealed during the ECC correction operation.

It may be desirable for performance purposes to defer a scrub corrective action even if it has been determined that corrective action is required. The reasons for doing so may include real-time considerations. For example a host may require a certain data transfer, and dedicating resources to scrub corrective action at certain times might impact the ability of the memory system to meet the guaranteed data rate. For such a purpose, the memory system may queue the scrub corrective action operation parameters for later processing, at a time when performing the scrub corrective action would not impact performance to the host. The scrub corrective action operations may be deferred until sometime later in the host command processing, sometime after the command processing, or until a later host command. The main point is that the scrub operation parameters would be stored and processed at a later time when it is most convenient to the host.

Additional Vulnerable Block/Page Criteria

In response to data being read from less than all of a group of memory cells by a host or otherwise, such as fewer than all the pages of a block, a scrub read is performed on a small proportion of the memory cells in the block, such as one or a small number of sectors, and the quality of the scrub read data is checked by use of the ECCs stored with the sectors of data. The scrub read most commonly, but not always, reads data stored in one or more pages that were not read in response to the command. If there are an excessive number of errors in the scrub read data, then the entire block is refreshed. A refresh operation involves reading all the data from the block, correcting the errors in the data by use of the ECCs, and then rewriting the corrected data into another block that has been erased. This process is desirably performed often enough to avoid the stored data being disturbed to the extent that they are no longer correctable by use of the ECCs, but not so often that performance of the memory system is excessively degraded. By limiting the scrub read to a small amount of the storage capacity of a block, such as just one or a few sectors or one or two pages, the overhead added to the memory operation by the scrub process is minimized. The scrub read and any resulting refresh are preferably performed in the background, when the memory system is not otherwise responding to commands to read or write data therein.

The scrub read preferably reads data stored in a page or pages of the block that are more vulnerable to having their data disturbed by the particular partial block command read than other pages of the block. It is preferred to identify a single most vulnerable sector or page, whenever that is possible, and then scrub read the data from it. Either way, a worse case picture of the quality of the data in the block is obtained with only a small amount of data needed to be scrub read. The impact on the performance of the memory system by such scrub reads is therefore minimized.

Objective criteria may be established to identify the portion of the group or block of memory cells, such as a page, that is more vulnerable to being disturbed by the command read than other portions of the group. At least some of the criteria are dependent upon the structure of the memory array. For example, in a NAND array, it is recognized that the pages formed by word lines at either end of the strings of series connected memory cells are more susceptible to disturbs from programming in other pages of the block than are the remaining pages in between. This is because the memory cells at the ends of the strings behave differently than those located away from the ends. If data in one or both of these pages has not been read in response to the command, it is likely that the data in the unread one of these pages have been disturbed to an extent that is greater than in other unread pages. A scrub read is then performed on the unread one or both of these more vulnerable pages.

Another of the criteria for selecting the more vulnerable page(s) may be established to be dependent upon which pages of the block have been read in response to the command and in what order. For instance, in the above example, even if one or both of the extreme pages of the block has been read in response to the command, one of these pages is desirably scrub read if it was read early in the execution of the command and therefore subject to thereafter being disturbed by the subsequent reading of other pages of the block. In such a case, the ECC check performed as part of the normal command read may no longer represent the quality of the data in that page because of potential disturbs that could have resulted from reading subsequent pages. If one or both of these extreme pages are read in response to the command at or toward the end of the commanded data read process, however, the ECC bit error checking that occurs as part of a normal data read provides information of the quality of the data in those page(s) so that another scrub read of the same page(s) need not take place.

A further possible one of the criteria for identifying a more vulnerable page is to identify a page that has not been read in response to the command but which is physically located adjacent a page that was so read. Disturbs are more likely to occur on this page than other pages in the block, with the possible exception of the two pages at the extreme ends of NAND memory strings. This will depend upon the specific structure of the memory cell array.

Yet another of the established criteria can be the relative patterns of data stored in the pages of the block. For example, in the NAND memory array, disturbs of the charge levels of memory cells in states near or at their lowest stored charge levels is more likely than those with charge levels near or at their highest stored charge levels. This is because potentially disturbing voltages experienced by a memory cell with the lowest charge level are higher than those of a memory cell with the highest charge level. Therefore, a page with data represented by predominately low charge levels stored in its memory cells will be more vulnerable to disturbs than one with data represented primarily by higher stored charge levels. This is therefore another factor that may be used to select a more vulnerable page as a candidate for a scrub read.

For further information on measuring errors and maintaining the integrity of data stored in flash memory, please refer to: U.S. Pat. No. 7,012,835 entitled "Flash memory data correction and scrub techniques," to Gonzalez et al; and U.S. patent application Ser. No. 11/692,829 entitled "Flash Memory With Data Refresh Triggered By Controlled Scrub Data Reads" to Jason Lin, which are hereby incorporated by reference in the entirety.

The ECC threshold for triggering a corrective action may be anywhere in the range of ECC correction capabilities, but is preferably around 75% of the capability. For example, if the ECC is capable of correcting 12 bits, corrective action may be triggered when around 8 bits in error are detected.

Ensuring Data Integrity in an Isochronous System with NAND Flash Storage

The use of the NAND flash memory device within an exemplary embodiment of an isochronous system will now be described. Other embodiments are of course contemplated and the present application should not be limited to the embodiments described.

Handling NAND flash media refresh operations efficiently is important in a low latency operating environment, especially an Isochronous system environment. The memory controller 19 incorporates an isochronous system ("IS") interface (the "ISI") in addition to the other interfaces such as those for a Secure Digital ("SD") card, Memory Stick, Compact Flash card, USB flash drive, or the like. Thus, one controller can be used to create any of the aforementioned devices.

The ISI monitors media error statistics and take action whenever needed to scrub or update the media, as described earlier. Since the IS environment does not allow flow control at the transaction level, a new approach has been implemented for media repair.

The problem is that in systems lacking signal level flow control constructs and requiring high system availability there is no way for the media control processor to test for and correct induced media errors.

In prior solutions that utilized a ROM to store a program, latency was not an issue due to the nature of ROM. For example, for a gaming system, it is important that the game itself be instantly accessible, so that the game play is fluid and responsive. To accomplish this, prior games were stored on ROM. However, each ROM was therefore masked out and otherwise manufactured specifically for each game title. The up front costs are therefore unnecessarily high in relation to the return if a game is not successful. In such a case a large inventory of game cartridges/cards and/or ROM's may be manufactured without subsequent demand. The present invention, however allows for different programs, including games, to be stored in an identical or even the same NAND chip. The systems and methods described herein can be used to overcome the latencies of the NAND so that it may be used in isochronous systems such as game machines. Of course, it should be understood that, although a game system has been mentioned for illustrative purposes, use of NAND will work for any isochronous system where quick and/or constant response time is desirable.

Isochronous System ("IS") Bus Operation

Figure 2:
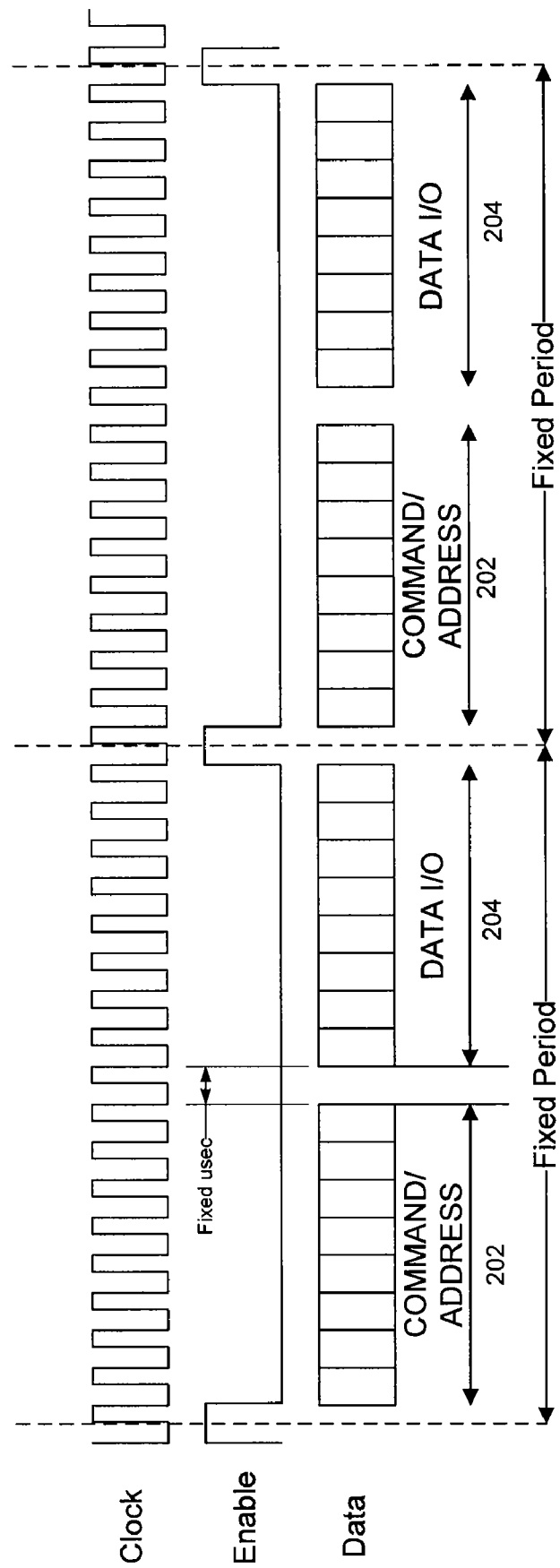
FIG. 2 is an illustration of isochronous system read operation.

One version of the IS read operation is shown in FIG. 2. From the time the last byte of the command is issued until the first byte of read data is returned is 230 usecs.

The system processor read operation/structure shown in FIG. 2 has been modified in order to better manage process delays of the NAND memory For integration purposes, in one embodiment the system processor command structure is augmented by wrapping the mode dependant RD_PAGE commands with a following READ_ST1 (read status one register) command within the same cycle or period. This can be seen in FIG. 4A. Each cycle 404A-x contains both a data operation and a status operation. In addition to the command input 202 and data output 204 of FIG. 2, represented as 406 and 408 respectively in FIG. 4A, there is a status operation 410 within each cycle or period 404A-x. Two bits have been defined in the STATUS1 register to relay the need for media error processing (flash memory data integrity operations). These bits can be seen in Table 1.

selected will affect the performance of the overall system and may be tailored to each application. A lower ratio will require the host to respond more quickly and may result in higher data reliability or integrity while a higher ratio will allow for better system response because the host will be able to allocate more time to running the processor application (e.g. game).

Figure 3:
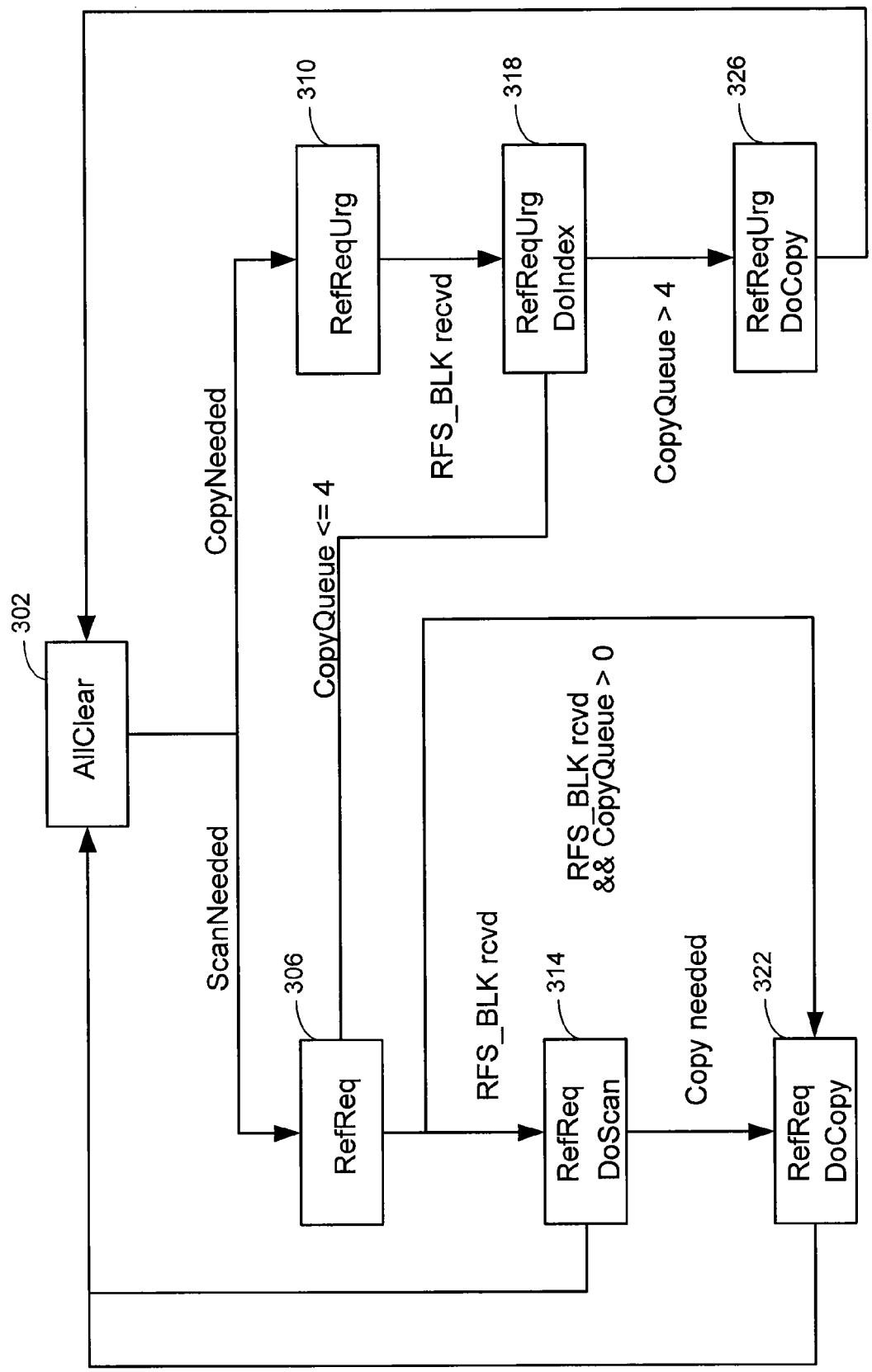
FIG. 3 is a scan and update state diagram.

A state diagram of media error processing interacting with the host's refresh status bits is shown in FIG. 3. The All Clear state 302 represents the initial media error free state. Whenever a scan request enters the scrub queue the (front end) memory controller firmware will need to post RefReq status (state 306) to STATUS1. Once the host responds with a RFS_BLK (refresh block) command the memory controller (front end) firmware will initiate a media scan operation (state 314). If the scan indicates a copy is needed, a request for the copy will be made, as indicated by state 322. If during the time between posting RefReq and receipt of the RFS_BLK command the block update queue goes not empty an update operation rather then a scan operation will be executed.

However, if a copy request enters the queue an urgent request to save the index of the block to be copied is posted, as represented by state 310. Once this request is satisfied a follow-on non-urgent request to satisfy the copy operation will be posted, as represented by state 318.

The index save serves to ensure guaranteed error processing across power cycles. Since the index save operation is short, performing the save at the highest priority will not negatively impact the gaming experience. There is a rare but possible situation where the number of copy requests in the queue start to accumulate. Whenever there are more than 4 copies in the queue the system should treat this as a critical event. If this queue overflow is detected the request will be urgent and the time hit will be at a maximum, as represented by state 326.

TABLE 1

| STATUS1 Register Layout | | | | | | | |
|---|---|---|---|---|---|---|---|
| D7 | D6 | D5 | D4 | D3 | D2 | D1 | D0 |
| Reserved | CacheRDY | READY | Protect | RefReqUrg | RefReq | Error | Error |

The RefReq bit (D2) will be set as a request for the host to initiate a refresh operation. This request is not considered urgent. The host will honor this request in as timely a manner as possible without sacrificing user interactivity. The second bit, RefReqUrg (D3) is an urgent request for a refresh operation. This host must find a way to honor this request as quickly as possible without regard for effects on the user experience.

From the memory controller firmware perspective these requests can be implemented by using the presence of scrub or update requests. Whenever the queue holding block scrub requests goes non-empty a request for a slot of time to go off line is made to the host device. This request is made via the RefReq and RefReqUrg bits in the STATUS1 register. Urgent requests are either important yet time efficient safety events, such as copy block index saves, or critical time consuming but low frequency events, such as the queuing of more than 4 block copies.

The queuing of 4 block copies is preferably used to denote an urgent request in the case where the queue holds eight total entries. In other words, when the queue is 50% full the request will be an urgent request. The range in the ratio of entries to available slots of the queue used to indicate an urgent request may be anywhere between ten and ninety percent. The ratio The base assumption is that the host will be timely in it's response to any refresh request, urgent or not. In one embodiment, the maximum latency between refresh status requests and the issue of a RFS_BLK command will be less than 6400 read operations. This is 1/10 the number of reads expected to complete successfully before an update event would be required. In some environments the maximum latency allowed may be a controlling criteria. For example, a gaming system may specify a maximum latency period, of 230 microseconds As mentioned above, a scan and/or copy queue is used to keep track of what blocks or other units of memory need to be scanned and/or copied. The queue may be stored in RAM or alternatively in the NAND flash memory itself. For more information on this, please refer to U.S. patent application Ser. No. 11/726,648 entitled "Methods For Storing Memory Operations In A Queue" filed Mar. 21, 2007, which is hereby incorporated by reference in the entirety.

Figure 4A:
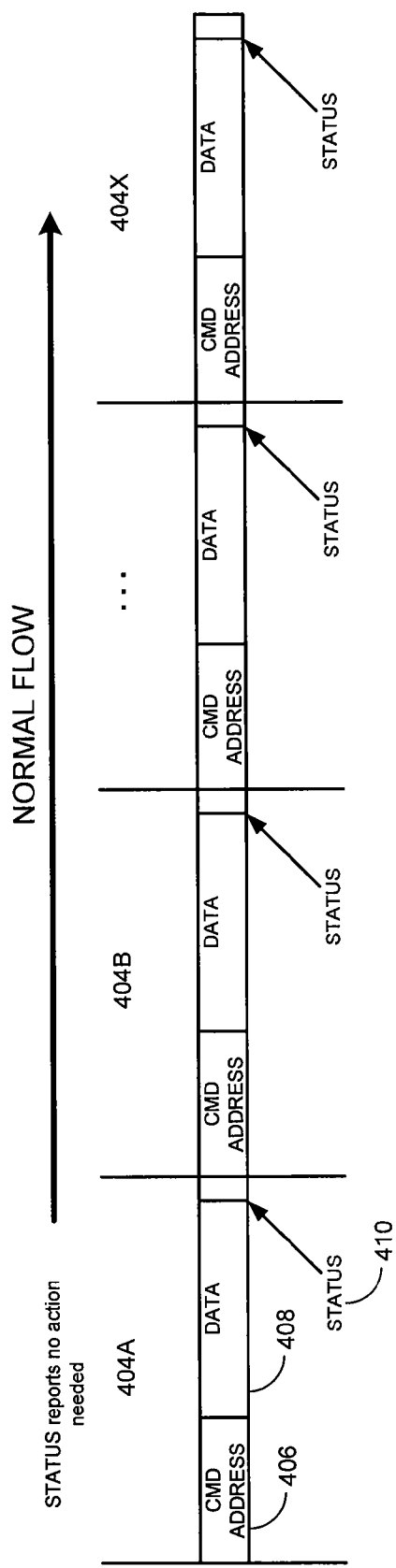
FIGS. 4A and 4B illustrate a first embodiment of command and data structure and flow for normal and wait flow respectively.

FIG. 4A illustrates a system processor command structure incorporating the read status (READ-ST1 discussed above) command 410 in each cycle/period 404A-x in order to read the STATUS1 register of Table 1 above. The command/address 406 is followed by the data 408 and the read STATUS1 command 410. During normal flow, the register will report that no action is needed.

Figure 4B:
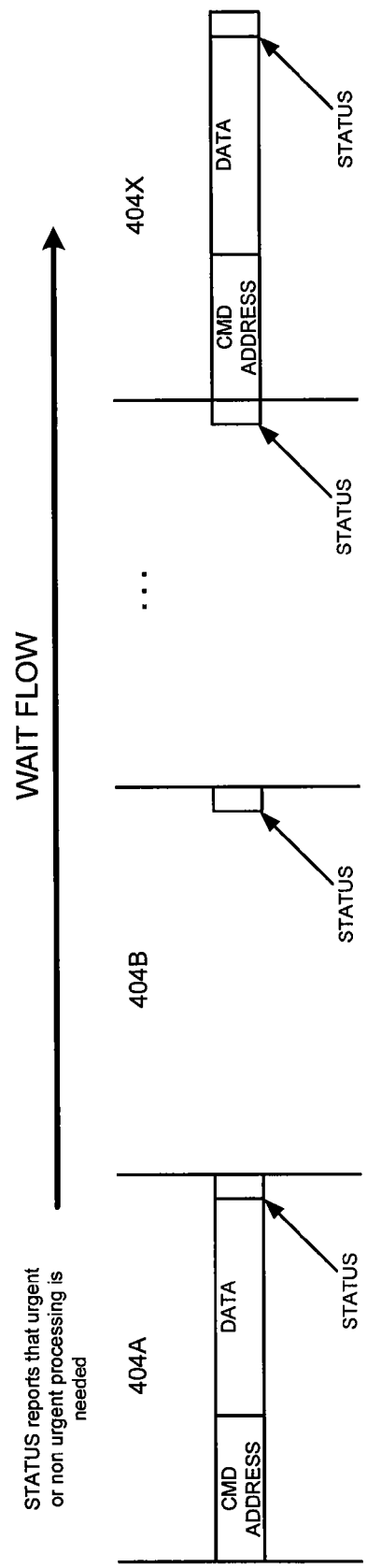

However, as seen in FIG. 4B, when the status register reports that urgent or non urgent processing is needed with bits D2 or D3, the host processor will wait some number of periods/cycles before sending another command. This will allow the memory to perform needed data integrity operations.

FIGS. 5A and 5B illustrate another embodiment of a system processor command structure. In this embodiment the mechanism for reporting the need to attend to the flash memory utilizes a data token 510 within each period/cycle 504A-x following the command/address 506 and data 508. As seen in FIG. 5B, when the data token 510 reports that urgent or non urgent processing is needed, the host processor will wait some number of periods/cycles before sending another command. The data token would comprise additional bits of information beyond the data 508 associated with the command (e.g. the data sent in response to a read). This will allow the memory to perform needed data integrity operations. The data token would contain some or all of the information contained in the STATUS1 register directly, as opposed to the mechanism in FIGS. 4A and 4B, that utilized status bits to indicate that the processor should read the register. For example, a multiplexer could be utilized/flipped to send the information from the register after data 508. In the embodiments of FIGS. 5A and 5B, rather than include an extra operation within each cycle, as is the case in FIGS. 4A and 4B, extra information (e.g. a few bytes) is appended to data 508 in the form of data token 510. This additional data provided within one cycle, e.g. 504A, informs the system processor about the next cycle, e.g. 504B.

Figure 6A:
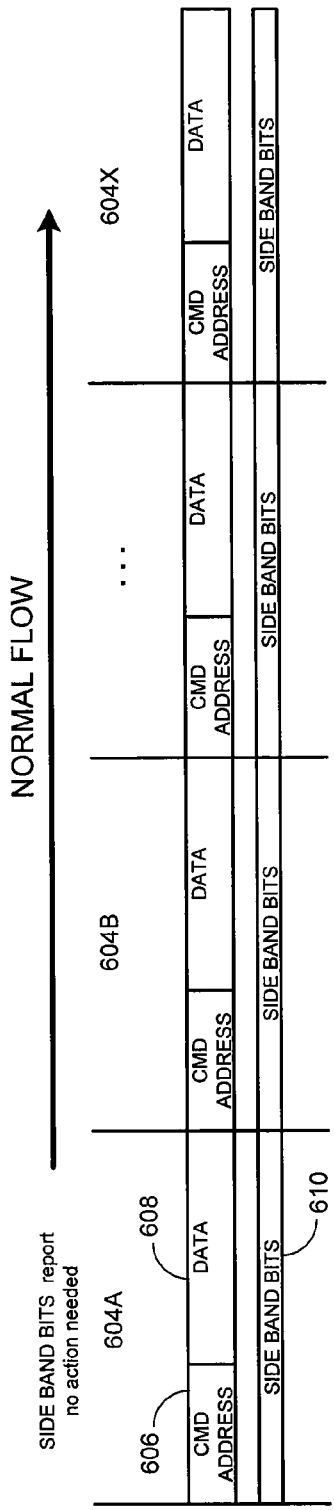
FIGS. 6A and 6B illustrate a third embodiment of command and data structure and flow for normal and wait flow respectively.
Figure 6B:
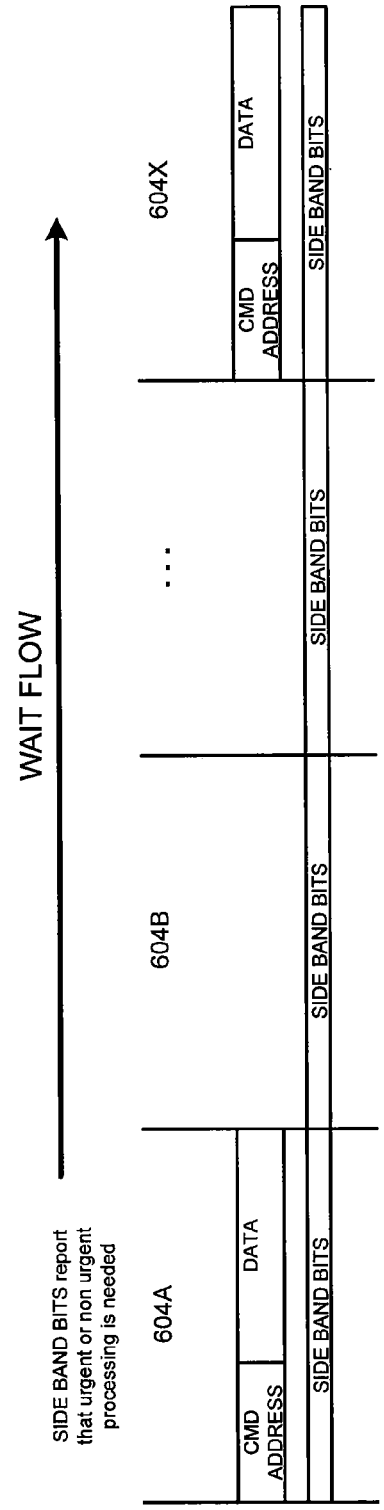

FIGS. 6A and 6B illustrate another embodiment of a system processor command structure. In this embodiment the mechanism for reporting the need to attend to the flash memory utilizes a side band bits 510 within each period/cycle 604A-x that are transmitted at the same time as command/address 606 and data 608, rather than after them. As seen in FIG. 6B, when the side band bits 610 report that urgent or non urgent processing is needed, the host processor will wait some number of periods/cycles before sending another command. The side band bits 610 contain some or all of the information contained in the STATUS1 register directly, or alternatively may direct the processor to read the STATUS1 register.

All of the embodiments illustrated in FIGS. 4-6 can be used to signal the need for extra time for data integrity operations in systems where a wait, busy or ready signal is not available and thus can be thought of as alternatives to flow control in isochronous systems lacking flow control.

Block Refresh Execution

A block refresh cycle is initiated whenever the host issues a RFS_BLK command. Once a RFS_BLK command is issued, only RD_STATUS1 commands are allowed until the refresh operation completes. Completion of refresh is indicated when both RefReq and RefReqUrg bits are set to zero.

In order to minimize the impact on (back end) BE memory controller firmware media fixup and host operating delays a minimum poll time of 50 mS has been specified for the NAND flash memory devices used in the IS systems. It is not a requirement that the firmware always finishes the scrub or update operations in 50 mS time but it is desirable that the system be able to respond to RD_STATUS1 commands potentially every 50 mS until the operations do complete. The 50 mS requirement is independent of Low/Normal speed functionality.

It is the responsibility of the host (system processor) firmware to generate RFS_BLK commands in as timely a manner as possible. In a gaming system this will be the game console processor's responsibility.

Power Failure

There is no early warning for power down in many electronic devices that may incorporate flash memory.

The embodiments described above ensure that if the power to the NAND memory device is interrupted that the information stored in the memory will be available when the power is restored. For example, a block that needs to be copied to another location that was in the process of being updated will be taken care of upon power restoration because it will be contained in the copy queue. This is true even given the demanding read requirements and timing limitations of an isochronous system such as that of a time sensitive application like video games and the like.

This is accomplished in part by utilizing command and data structures that notify the host of the need for urgent or non urgent processing of operations needed to assure data integrity. This notification is accomplished while requiring only minimal processing time. The system processor then allocates time to update and service the queue on an as needed basis. Time will be allocated in a timely fashion before the reliability of the data blocks is past an undesirable threshold. An urgent command is used to update the queue. A non urgent command is used to scan or to copy a block. Once an entry is in the queue and the queue is updated, the status will no longer be urgent.

What is claimed is:

1. A non volatile storage device, comprising:
   a flash memory array; and
   a memory controller,
   the memory controller configured to perform data integrity operations of data in the flash memory array to maintain the integrity of the data in the flash memory array,
   the data integrity operations occurring at unpredictable intervals resulting in a variable latency in servicing requests for data storage operations from a host device,
   the memory controller further configured to manage the execution of data integrity operations so that a maximum allowed latency limit is not violated
   wherein the memory controller is further configured to monitor when the execution of a first data integrity operation triggers the execution of a subsequent data integrity operation, to ensure that the maximum allowed latency limit is not violated due to the triggering of the subsequent data integrity operation, and the time required for carrying out the first and subsequent data integrity operations.

2. The non volatile storage device of claim 1, wherein the memory controller is further configured to cause the host device to delay an operation by issuing one of two or more levels of a request to the host device if it has been determined that the delay can be tolerated.

3. The non volatile storage device of claim 2, wherein the memory controller is further configured to service isochronous requests from the host device within a plurality of command cycles and the one of two or more levels of a requests is issued within one of the command cycles.

4. The non volatile storage device of claim 2, wherein the two or more levels comprise an urgent level of a request and a non-urgent level of a request.

5. A system comprising:
   a host device comprising a microprocessor; and
   flash memory storage device comprising a flash memory array and a memory controller, the host device operating in an isochronous manner, the memory controller configured to perform data integrity operations of data in the flash memory array to maintain the integrity of the data in the flash memory array, the data integrity operations occurring at variable intervals resulting in a variable latency in servicing requests for read and write requests by the microprocessor of the flash memory storage device, the flash memory controller comprising a mechanism to service isochronous requests of the host device and to notify the host device via indicators at the end of each command cycle and that specify the need to allocate time for performing data integrity operations.

6. A system comprising:

a host device comprising a microprocessor; and flash memory storage device comprising a flash memory array and a memory controller, the host device operating in an isochronous manner, the memory controller configured to perform data integrity operations of data in the flash memory array to maintain the integrity of the data in the flash memory array, the data integrity operations occurring at variable intervals resulting in a variable latency in servicing requests for read and write requests by the microprocessor of the flash memory storage device, the flash memory controller comprising a mechanism to service isochronous requests of the host device and to notify the host device of the need to allocate time for performing data integrity operations, wherein the mechanism to service isochronous requests comprises one or more indicators provided at the end of each command cycle, and wherein the indicators cause a register to be read by the host device, the register values signalling whether an urgent or non-urgent request for servicing the memory storage device is present.

7. The system of claim 6, wherein the mechanism to service isochronous requests is in the form of a data token.

8. The system of claim 6, wherein the mechanism to service isochronous requests comprises side band bits provided during the time interval in which a command and data are provided to the flash memory storage device.

9. The system of claim 5, wherein the mechanism comprises a read operation.

* * * * *